United States Patent [19]
Martinek

[11] 3,805,330
[45] Apr. 23, 1974

[54] METHOD OF HUMIDIFICATION OF SYNTHETIC SAUSAGE CASINGS

[75] Inventor: Thomas W. Martinek, Danville, Ill.

[73] Assignee: Tee-Pak, Inc., Chicago, Ill.

[22] Filed: Nov. 17, 1971

[21] Appl. No.: 199,460

Related U.S. Application Data

[62] Division of Ser. No. 888,701, Dec. 29, 1969, Pat. No. 3,657,769.

[52] U.S. Cl............................. 17/49, 264/40, 264/95
[51] Int. Cl................................................ A22c 13/00
[58] Field of Search............ 99/176, 175; 17/42, 49; 239/567

[56] References Cited
UNITED STATES PATENTS

| | | | |
|---|---|---|---|
| 3,222,192 | 12/1965 | Arnold et al............... | 99/176 |
| 3,594,856 | 7/1971 | Michl........................ | 17/42 |
| 3,462,794 | 8/1969 | Martinek................... | 99/176 |
| 3,469,088 | 9/1969 | Coleman et al............ | 239/567 |
| 3,209,398 | 10/1965 | Ziolko....................... | 99/176 |
| 3,266,911 | 8/1966 | Clement..................... | 99/176 |
| 3,097,393 | 7/1963 | Matecki..................... | 99/176 |
| 3,616,489 | 11/1971 | Voo et al................... | 99/176 |
| 3,326,551 | 6/1967 | Clarke....................... | 239/567 |
| 2,386,122 | 10/1945 | Klingen..................... | 239/567 |

Primary Examiner—Morris O. Wolk
Assistant Examiner—Sidney Marantz
Attorney, Agent, or Firm—Neal J. Mosely; Russell L. Brewer

[57] ABSTRACT

Method and apparatus for shirring synthetic sausage casings, e.g. regenerated cellulose, amylose, alginate, collagen casings, etc., wherein a flattened tubular casing is fed from a storage reel, inflated, and shirred mechanically and the casing, aftr leaving the storage reel and prior to being discharged from the shirring apparatus, is passed axially through a symmetrical, radially converging pattern of sprayed water in which the casing is contacted by and consequently adsorbs a predetermined metered amount of water. The spraying of the casing preferably is effected by an annular spray nozzle having a plurality of equiangularly spaced orifices positioned in its inner periphery to direct water uniformly onto the outside surface of the casing. Control of the spraying is accomplished by positioning valve control means in the water feed line to the spray device and operatively connecting the valve means to be responsive to the operation of the means for feeding casing through the shirring machine.

2 Claims, 4 Drawing Figures

METHOD OF HUMIDIFICATION OF SYNTHETIC SAUSAGE CASINGS

CROSS REFERENCE TO RELATED APPLICATION

This application is a division of copending Application Ser. No. 88,701, filed Dec. 29, 1969, now U.S. Pat. No. 3,657,769.

BACKGROUND OF THE INVENTION

1. Field of the Invention

This invention relates to new and useful improvements in the shirring of artificial sausage casings and more particularly to the humidification of artificial sausage casings during the shirring thereof.

2. Description of the Prior Art

Artificial sausage casings, particularly casings formed of regenerated cellulose, are prepared as hollow, thin walled tubes of very great length. For convenience in handling, these casings are shirred from lengths ranging from 40–160 ft. or more down to a shirred and compressed length of the order of a few inches. An early type shirring machwne and the resulting shirred product are shown in Dietrich U.S. Pat. No. 2,010,626. Improved forms of shirring machines and the products thereof are shown in Korsgaard U.S. Pat. No. 2,583,654; Blizzard et al, U.S. Pat. Nos. 2,722,714, 2,722,715, and 2,723,201; Gimbel U.S. Pat. No. 2,819,488; Matecki U.S. Pat. Nos. 2,983,949 and 2,984,574; Clement U.S. Pat. No. 3,266,911; Arnold U.S. Pat. No. 3,454,982; and Martinek U.S. Pat. Nos. 3,454,981 and 3,456,286.

In the preparation and use of artificial sausage casings, particularly casings formed from regenerated cellulose, the moisture content of the casings has been of extreme importance. When the casings are first formed, it has been necessary that they be dried to a relatively low water content, e.g. 8–10 percent. A lower water content in the casing generally results in damage to the casing during the shirring operation and sometimes makes shirring completely impossible. Similarly, a high water content has resulted in damage to the casing during shirring, usually resulting from the casing's sticking to the shirring mandrel.

After a casing is shirred, it is packaged and shipped to a meat packing house where an individual shirred strand is placed on a stuffing horn and a meat emulsion extruded to fill the casing to its fully extended length. The stuffing of the casing usually takes place within a few seconds with the result that the casing is extended from a shirred length of 8–27 in. to an extended length of 40–160 ft. or more at a rate of 2–6 ft./sec. This rapid extension of the casing during stuffing requires the casing to be especially strong and resistant to tearing. If even minor holes develop in the casing, the casing may split or break during stuffing and waste a large quantity of meat.

In the shirring of artificial sausage casings, the pleats which are formed are sometimes interlocked and are almost always nested in a concave manner to provide a tightly compressed strand of casing for shipment and handling. The tightly compressed and sometimes interlocked pleats require a higher moisture content to permit extension of the casing during the stuffing operation without tearing or breaking the casing. In general, an average moisture content of 15–20 percent has been required, preferably about 17–18 percent. If the shirred casing has a moisture content appreciably less than about 15 percent, there is a tendency toward excessive breakage during stuffing. Likewise, if the casing has a moisture content in excess of about 20 percent, the casing is too plastic and may tend to overstuff.

It is, therefore, essential that shirred casing be humidified to a relatively narrow, critical moisture content which is very uniform throughout the length of the casing to permit stuffing without breakage.

In the past, shirred artificial sausage casings have been packaged in cartons or containers which are apertured at opposite ends to permit the circulation of moist air through the shirred casing strands to produce the desired moisture content in the casings.

When shirring machines of the type shown in Dietrich U.S. Pat. No. 2,010,626 were in use, the shirred casings which were produced were accordion pleated but did not have nested concave pleats which were tightly compacted to provide shirred strands which were self-supporting. As a result, the shirred casing strands had to be packaged in small individual packages which were easily removed from the strand at the packing house after insertion over a stuffing horn. These individual cartons were apertured on both ends, and the packaged casings were humidified by passing moist air through and over the casing strands.

At a later date, a package was developed for shirred casings, as shown in Hewitt U.S. Pat. No. 2,181,329, which had a plurality of apertures at opposite ends and which would contain a large number of shirred casings. The Hewitt package was designed to permit the packaging of a number of shirred casing strands while providing for circulation of moist air through and about the strands to bring the moisture content to the level required for satisfactory stuffing.

An improvement on the shirred casing carton of Hewitt is described and claimed in Firth U.S. Pat. No. 2,794,544. The Hewitt and Firth packages, however, are both subject to substantial objections in commercial use. These packages are expensive to make because of the spaced perforations required in the ends of the cartons and suffer from severe mechanical weakness in the perforated end walls which result in breakage of the end walls from time to time.

The development of improved shirring machines of the type shown in the Korsgaard, Blizzard et al, Gimbel, Matecki, Clement, Arnold, and Martinek patents made possible the shirring of greater lengths of casing than had been previously possible. The Blizzard et al shirring machine produced a shirred casing having accordion pleats which are nested tightly in a concave manner with the result that the shirred and compressed casing could be held without external support. As the casing industry has tended to produce longer and longer shirred strands, e.g. today strands up to 160 ft. are shirred, the problem of humidifying casing to the critical moisture content required for satisfactory stuffing has become increasingly difficult. In longer lengths of shirred casing, there is a considerable resistance to flow of moist air through the casing with the result that the ends of the casing tend to be more moist and the center of the casing less moist. Also, the moist air humidification technique has not been entirely practical for the humidification of heavy gauge casings and fibrous casings used for packaging of larger sausages and chunks and pieces of meat.

A technique for the humidification, during shirring, of synthetic sausage casings to the critical moisture content required for satisfactory stuffing is disclosed in Arnold et al. U.S. Pat. No. 3,222,192. In this technique, moisture is transferred externally to dry casing reel stock by the metering rolls, feed belts, shirring belts or shirring wheels. However, the use of such a technique suffers the disadvantages of often requiring a surfactant for satisfactory distribution and of not being totally suited for use on the bulk of commercial shirring machines which are designed to operate intermittently. In such machines, a metered length of casing is shirred, the machine is then stopped, and the shirred portion of casing is severed and transferred within the machine. During the time that the shirring machine is stopped, unshirred casing is between the moistened belts, rolls, and the like for sufficient time to absorb most of the water on the contacting surfaces of the elements. This results in the application of a large excess of water to a small section of the casing during the time that the machine is at rest. The overly wetted casing consequently is more susceptible to damage when stirring is resumed.

Attempts to suitably humidify casing by contact with wet belts, rolls, and the like also suffer from a further disadvantage. Proper metering of the water is difficult since, at the rotational speeds of the belts, rolls, or wheels used to transfer the water to the casing, significant amounts of water are thrown off the rotating surfaces in directions away from the casing.

Another approach involves the use of a porous capillary applicator contacting the casing after leaving the storage reel and prior to the point where the shirred product is discharged from the shirring apparatus. This method is disclosed in Martinek U.S. Pat. No. 3,462,794. This improvement obviates the need for a surfactant but still suffers drawbacks due to a non-uniform application of water, insufficient transfer rates, plugging of capillary passages and occasional non-contacts due to casing size variations or misalignments. Also, a different size capillary applicator is required for each different size of casing.

STATEMENT OF OBJECTS AND FEATURES

Accordingly, it is the primary object of this invention to provide a new sausage casing shirring apparatus which also provides for improved humidification of sausage casings.

Another object of this invention is to provide a new shirring apparatus which produces uniformly humidified shirred synthetic sausage casings.

An additional object of this invention is to provide a new sausage casing shirring apparatus adapted to operate intermittently and produce uniformly humidified shirred sausage casings.

A further object of the present invention is to provide a new sausage casing shirring apparatus adapted to controllably and uniformly humidify sausage casings of widely varying sizes to predetermined moisture levels without the use of wetting agents and with relatively little loss of humidification fluid.

Yet another object of the present invention is to provide a new and improved method for shirring sausage casings wherein the shirred casings produced advantageously are uniformly humidified to predetermined moisture content.

Features of the present invention are the provision of a new and improved sausage casing apparatus and method for shirring and humidifying sausage casing having as characteristics the properties described in the above objects.

SUMMARY OF THE INVENTION

This invention comprises a new and improved method and apparatus for moistening synthetic sausage casings during the shirring thereof. More particularly, the apparatus of this invention is provided with conventional means for feeding casing onto a support mandrel, inflating the casing supported on the mandrel, and shirring the inflated and supported casing, and further includes controlled means for applying water or other fluid to the inflated casing prior to its being shirred, which controlled fluid applicator means is adapted to deliver, in response to the operation of the casing feeding means, metered amounts of water or other fluid uniformly onto the exterior surface of the inflated casing in the form of a symmetrical spray pattern convergent of the axis of the inflated casing. The term "spray" as used herein is intended to refer to fine directional streams of liquid and to embrace directed fine streams which are continuous and directed fine streams wherein separate droplets of the liquid are present. The type of spray delivered depends primarily upon the size and shape of the orifice or orifices of the spray applicator and the humidification fluid feed pressure thereto. The spray can be delivered through the orifices of one or more commonly supplied spray devices which are disposed about the periphery of the casing and adapted to spray water in one (i.e., a curtain) or more streams. Means are provided for supplying metered amounts of water or other fluid to the spray device or devices, using a common manifold in the latter case. The supply means includes valve means for controlling the fluid feed to the spray device or manifolded devices, which valve means is operatively connected to the casing feeding means of the apparatus to be responsive to the actuation and deactuation of the casing feeding means whereby upon the actuation of the casing feeding means the valve means is opened and upon the deactuation of the casing feeding means the valve means is closed.

The combined features of the shirring apparatus of the present invention enable sausage casings to be shirred and uniformly humidified to predetermined moisture contents. Application of the humidifying liquid to the casing as a spray results in several significant advantages. Unexpectedly it was found that casing-humidifying amounts of water sprayed onto the exterior of inflated casing, particularly in instances wherein the directed water is in the form of fine continuous streams, are essentially totally adsorbed by and become uniformly distributed throughout the casing and that there is relatively little loss or run-off of humidification liquid delivered to the casing. In fact, in cases wherein water is applied to the casing in the form of fine continuous streams, no liquid run-off from the casing is observed at all except at points where an already moistened casing comes into contact with feeding belts and the like, and then the loss observed is relatively little, i.e., on the order of 10 percent or less. Since spraying is controlled in the apparatus of the present invention to apply liquid to the casing only during periods during which the casing feeding means is actuated and casing consequently is being fed past the spraying means of the apparatus, by means of the use of the shirring apparatus of the invention, humidification suitably can be carried out even though the accompanying shirring is intermittent, the heretofore encountered problems of localized under- and over-humidification of the casing are eliminated, the amount of humidification liquid applied to a casing can be more closely controlled than previously possible, and humidified casings of improved uniformity result. Furthermore, the controlled spray humidification-shirring apparatus of the present invention is more versatile than previous shirring devices having casing humidification provisions. Previous devices relying upon belts, wheels, and the like to transfer humidification liquid to the casing by contact therewith, usually could be employed only with casings of the same or very similar diameter. In contrast, the apparatus of the present invention, using one or more spray devices which remain removed from and out of contact themselves with the casings, advantageously are adapted to be employd to shirr and humidify widely varying casing sizes.

DESCRIPTION OF THE PREFERRED EMBODIMENTS

Figures 1, 1A:
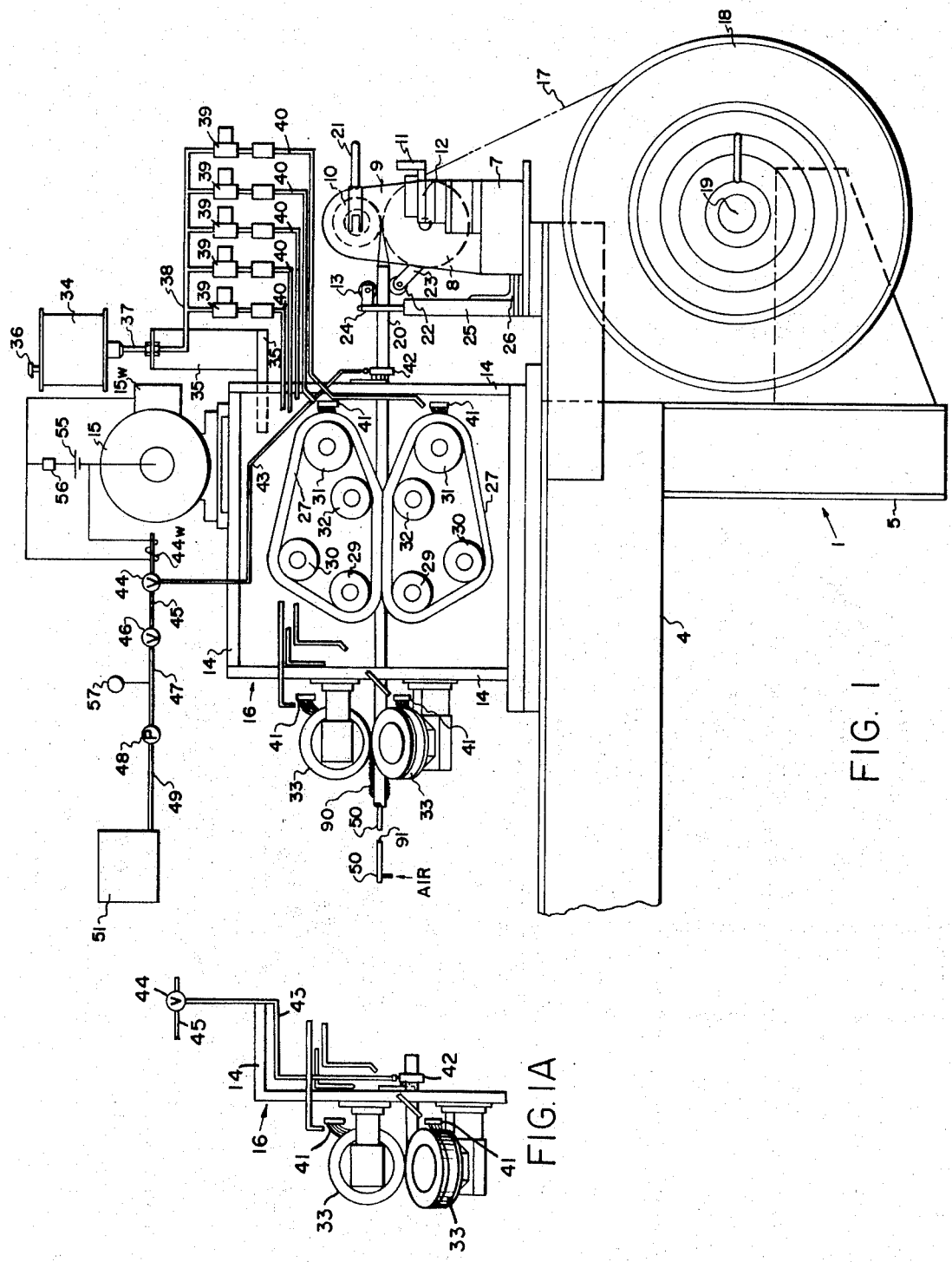
FIG. 1 is a view in elevation (but partly diagrammatic) of a portion of a conventional shirring machine having the shirring head construction shown in U.S. Pat. Nos. 3,310,833 (Clement) and 3,454,981 (Martinek) and including the fluid applicator of this invention for application of water or other fluid to the casing.
FIG. 1A is a detail view of part of the apparatus of FIG. 1 illustrating an alternate location of the fluid applicator.

Referring now to FIG. 1 of the drawings, the improved method and apparatus of this invention is illustrated similarly as the apparatus of the type shown in the above-described Clement and Martinek patents. In comparing the apparatus of FIG. 1 with the corresponding figure in the Clement and Martinek patents, the same reference numerals are not used for the same parts shown in the patents, but the correspondence of parts and manner of operation will be apparent. In FIG. 1, there is shown an angle iron welded frame 1 which includes a bottom longitudinal angle (not shown), a top longitudinal angle 4, and an upright angle 5. The remaining portions of a suitable frame 1 are disclosed in more detail in FIG. 1 of Clement and Martinek patents to which reference is made for a more complete understanding of the same.

Mounted on the top supporting angle 4 is plate 7 which carries a measuring roll 8. Measuring roll 8 is rotatably mounted between support plates 9 which also support a rotatable squeeze roll 10. Cooperating with measuring roll 8 is a metering disc 11 that is arranged to operate a measuring limit switch 12 for stopping further operation of the shirring head when a predetermined length of casing has been shirred. A tear limit switch (not shown) may also be provided for stopping further operation of the shirring head in the event that the casing becomes torn. Such switches are described in detail in U.S. Pat. Nos. 2,722,714; 2,722,715 and 2,723,201. Where provided, such a tear limit switch may be operated by a roller 13 which engages the upper side of the inflated casing.

Mounted on the angle iron frame 1 are shirring head support plates 14 which constitute the framework for the shirring head, further details of which will be described hereinafter. Mounted on plates 14 is a shirring head motor 15 that is suitably controlled for starting, driving, and stopping the shirring head which is generally referred to as 16.

Shirring head 16 is arranged to receive a relatively thinwalled synthetic sausage casing 17 from reel 18 that is rotatably mounted on shaft 19. As the casing 17 comes from reel 18, it is flat, and sometimes referred to as reel stock. The casing passes between measuring roll 8 and squeeze roll 10 and then is inflated as shown at 20. Squeeze roll 10 is moved into and out of position by handle 21. Immediately below roller 13 which operates the tear limit switch and on the under side of inflated casing 20 is a roller 22 carried by arm 23. Roller 22 is employed to limit the downward movement of roller 13 when the casing is deflated. The casing is drawn over a mandrel 50 which has a central longitudinal aperture 91 through which air flows under a slight pressure to inflate the casing to its full diameter prior to the shirring operation. The central aperture also can be used, if desired, to introduce materials such as lubricants and coating materials into the interior of the casing.

The inflated casing 20 is directed into shirring head 16 between guide rollers 24 which are mounted on vertical supports 25 secured to and extending from arms 26 on plate 7. Using shirring head 16 constructed as herein disclosed and with appropriate changes in the openings and the shirring dogs or lugs, it is possible to shirr a wide range of sizes of synthetic sausage casings. The casings with which this invention can be employed, for example, may range in internal diameter from about ½ in. to about 2 in., in thickness from 1-4 mils, and in length from about 30-200 ft. While the reel 18 contains an indeterminant length of casing, the casing wound thereon is cut into lengths of the order of 30-200 ft. depending upon the requirements of the meat packer. The casing is shirred to the desired length, severed, and the shirred casing removed from the machine. While the apparatus is used primarily in the shirring of cellulosic casing, it may be used in the shirring of fibrous casing, amylose or starch film casing, collagen film casing, alginate film casing, etc. The shirring head shown in this figure can be used in conjunction with a turret as described in U.S. Pat. No. 2,583,654 or a floating mandrel construction as described in U.S. Pat. No. 2,010,626 or other similar arrangements.

Shirring head 16 includes upper and lower feed belts 27 which cooperate to form a closed circular passage which assists in feeding the inflated casing to the shirring elements of the machine. Feeding belts 27 are supported on pulleys or wheels 29, 30, 31, and 32. Motor 15 is connected by a drive pulley or other suitable drive mechanism (not shown) to one of the wheels supporting belts 27 and is operable to drive the belts in coordination to feed the casing 20 along mandrel 50 to shirring wheels 33.

Means preferably are provided for lubricating belts 27. A lubricant storage tank 34 is supported by plates 35 and secured to shirring head plates 14. The tank 34 has an inlet opening 36 and bottom outlet opening connected to tubing 37 which is in turn connected to manifold 38. Manifold 38 is connected to valves 39 and outlet tubes 40 which are arranged to supply lubricant to brushes 41 which are positioned for engagement with feeding belts 27 or shirring wheels 33.

In accordance with the present invention, the shirring apparatus of the present invention is provided with means for humidifying casing 20 while it is inflated and prior to its being shirred by wheels 33. As illustrated in FIG. 1, the casing humidification means includes at least one spray device 42 disposed in relation to inflated casing 20 to be adapted to direct water or other fluid onto the exterior of inflated casing 20. In FIG. 1, spray device 42 is depicted as being positioned in front of casing feeding belts 27 along the line of travel of casing 20.

Means are provided for supplying water or other fluid to spray device 42. As shown in FIG. 1, spray device 42 is connected through conduit 43 to a spray device feed control valve means constituted by solenoid valve 44 which in turn is connected by conduit means (conduits 45, 47, and 49) to a pumping means 48 adapted to deliver liquid to applicator device 42 from a supply of water or other liquid designated generally as 51.

In accordance with the present invention, pumping means 48 is adapted to deliver liquid to spray device 42 when applicator feed control valve 44 is open. When this condition exists, humidification liquid is sprayed onto casing 20. Pumping means 48 delivers humidification liquid to applicator device 42. The amount of liquid sprayed onto the casing 20 is predetermined by metering means shown diagrammatically in the system. In the arrangement shown, the desired metering is achieved by a metering valve 46, such as that shown in Martinek U.S. Pat. No. 3,462,794, which is adjustable to varying flow rate settings, which settings may be varied in response to indications registered by a calibrated flow meter, or other suitable flow rate measuring device 57 (shown diagrammatically) located in the humidification liquid feed line 47.

Solenoid valve 44 is operatively connected in the apparatus to be responsive when the casing feeding means of the apparatus is actuated and deactuated. In the embodiment depicted, the winding 44w of solenoid valve 44 is connected across an electrical circuit containing winding 15w (shown diagrammatically) of the shirring head motor and the power source therefor generally shown as 55. In accordance with the embodiment shown, when winding 15w is energized and casing is fed through the apparatus and shirred, winding 44w of valve 44 is energized, thereby opening valve 44 and causing casing 20 fed past spray device 42 to be subjected to a spray of humidification liquid. Shirring head motor 15 is started and stopped by switch 56 (shown diagrammatically). When shirring head motor 15 is de-energized by the operation of switch 56, solenoid valve winding 44w is de-energized causing valve 44 to close and interrupt the spraying of casing 20. By means of this arrangement, humidification liquid is applied in predetermined metered amounts uniformly along the length of casing 20 as casing 20 is fed through the humidification zone including spray device 42.

Figures 2, 3:
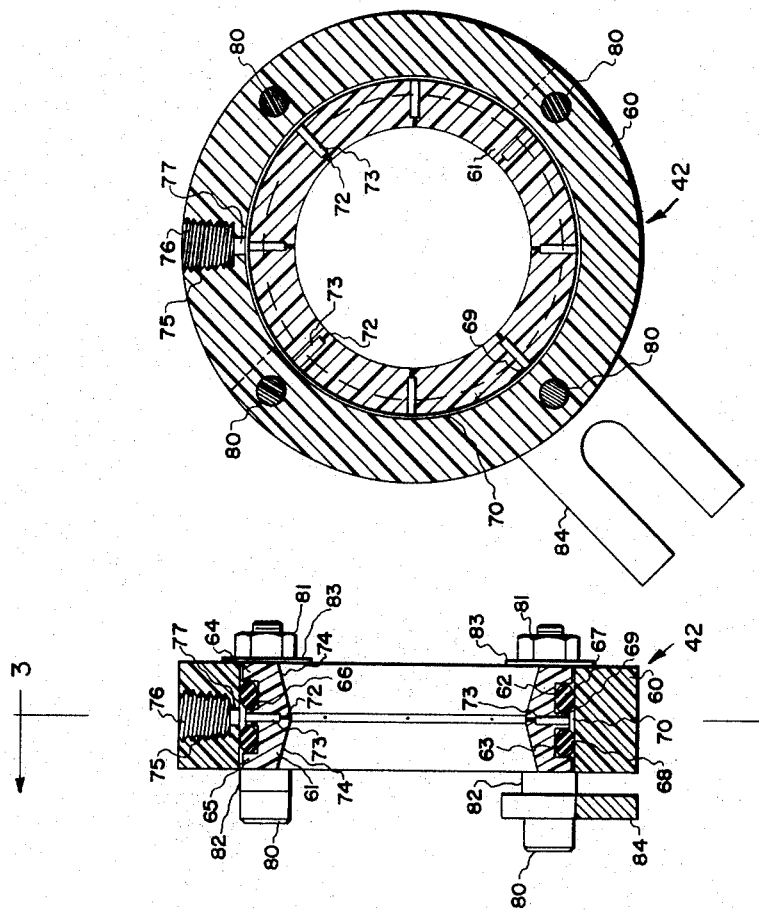
FIG. 2 is a side sectional view of the preferred embodiment of the assembled fluid applicator shown in FIGS. 1 and 2.
FIG. 3 is a section view taken along line 3—3 of FIG. 2.

FIGS. 2 and 3 show the preferred embodiment of the spray device 42 employed in the apparatus of this invention. The spray device is an annular ring assembly comprising a housing ring member 60 and a nozzle ring member 61 fitted within the housing ring. Housing ring member 60 has a generally smooth inner peripheral wall surface 70. Nozzle ring member 61, on its outer peripheral wall surface, is provided with parallel circumferential grooves 62 and 63 which form circumferential ribs 64 and 65 adjacent the outside edges of ring member 61 and circumferential rib 66 which is upstanding between grooves 62 and 63. Rib 66 has an outside diameter which is less than the inside diameter of housing ring member 60. O-rings 67 and 68 formed of a deformable material are positioned in grooves 62 and 63, respectively, whereby an annular chamber 69 is defined by the inside wall 70 of housing ring member 60, rib 66, and O-rings 67 and 68. Nozzle ring member 61 is provided on its inside peripheral surface with a plurality of orifices 72 which are equiangularly spaced apart and which communicate with annular chamber 69 through cylindrical openings 73 which radially extend through ring member 61. In the preferred embodiments of the invention, orifices 72 are circular openings of capillary dimensions, and more preferably 0.004 to 0.010 in. diameter. Preferably at least four, and more preferably at least eight, orifices 72 are provided. Housing ring member 60 has an opening 75 having threads 76 for receiving the end of a humidification liquid feed conduit such as conduit 43 shown in FIG. 1 which thus communicates through opening 75 with annular manifold chamber 69 of the spray device. The spray device assembly is held together by bolts 80 on which are located spacer elements 82, washers 83, and nuts 81. A support element 84 on one of the plates 14 (see FIGS. 1 and 1A) is attached to spray device 42 to support same adjacent casing 20 in such a manner that spray device 42, mandrel 50, and consequently inflated casing 20, are coaxial and orifices 72 of spray device 42 are adapted to emit a spray of water or other fluid onto the exterior surface of inflated casing 20 in a symmetrical spray pattern convergent of, and preferably normal to, the axis of casing 20. Although humidification fluid run-off from casing 20 is not a problem with the present apparatus, the inside surface of spray device 42 may be beveled as at 74 to ensure that orifices 72 remain unblocked should humidification fluid application be excessive during periods of metering alteration.

In evaluating this invention, a large number of experiments were carried out in which different sizes, lengths and gauges of synthetic sausage casings were shirred and humidified as heretofore described. This process has been used in the shirring of thin walled small size sausage casings of the type used for frankfurters and other small sausages and for heavy gauge large size cellulose casings and fibrous casings used in the packaging of large sausages. The performance of these casings was compared with casings which had been humidified to substantially the same moisture content using the prior art technique of circulating moist air over shirred casing strands contained in a perforated carton. In evaluating this humidification and shirring technique, it was necessary to determine its effectiveness on hundreds of strands of sausage casings to determine whether or not it would be satisfactory for commercial use. This was particularly true in the case of the thin walled small size sausage casings. It is, therefore, impractical to set forth either by specific example or in a tabulated form the results obtained on the application of this humidification and shirring technique to any statistically significant number of shirred casing strands. A number of regenerated cellulose casings of the type used for production of frankfurters and other small sausages were shirred and humidified in accordance with this invention. The casings ranged in diameter from 22.50 – 49.50 mm. and varied in thickness from about 0.9 – 1.5 mils. Casings ranging from 55 – 160 ft. in length were shirred and humidified using the apparatus described in the several figures of the drawings. These casings had an initial moisture content of about 7 – 9 percent and were humidified to a moisture content of about 16 – 18 percent by application of water during shirring. Several experiments were also carried out with fibrous casing having an initial water content of about 25 percent. Fibrous casing was humidified and shirred in this manner and was highly satisfactory for the preparation of large size sausages. The frankfurter sausage casings which were shirred and humidified in this manner had a breakage of less than 0.5 percent which is equal to or lower than the breakage of casings of the same size which were shirred dry and then humidified to the same moisture content using the moist air humidification of the prior art.

Especially advantageous results were obtained using a spray applicator device of the type shown in FIGS. 2 and 3 having eight circular orifices of a diameter of 0.006 in.–0.010 in., a length of 0.02–0.4 in., and arranged equiangularly in a circular pattern having a diameter of 1.2 – 10, more preferably 1.2 – 4, times outside diameter of the casing being sprayed and with the applicator device operating at a feed pressure of 2 – 4 psig to moisten casings being fed through the apparatus at casing feed and shirring speeds of 10 – 20 ft./sec. by contact with fine continuous streams of water.

As stated, one of the principal advantages which has resulted from this invention is a more uniform humidification of shirred casings along the entire length and along the major and minor pleat structure. Casings which have been humidified to a moisture content of 17 – 18 percent using the prior art moist air humidification technique often vary as much as 3 – 5 percent in moisture content between the major and minor pleats and vary even more in moisture content along the length of the shirred casing strand. For example, a 160 ft. shirred casing (29 in. shirred length) was humidified to an average moisture content of 18 percent using the prior art moist air humidification technique. The moisture content of the casing was found to vary from 20 – 21 percent at the extreme ends to 12 percent at the center of the strand. The moisture will distribute evenly within the casing strand upon extended storage, but substantial differences in moisture content between the ends and middle of the strand have been found after storage periods of 60 – 90 days and longer. A 160 ft. shirred strand (20 in. shirred length) was humidified to a 17 – 18 percent moisture content using the procedure of this invention as described above, and the moisture content had no measurable variation along the length of the casing and between the major or minor pleats or the inside or outside of the shirred strand.

While this invention is particularly applicable to the shirring and humidifying of sausage casings or cellulose of the type used for the preparation of frankfurters, the process is obviously applicable to the shirring and humidification of a wide range of casings. The process is primarily useful for thin walled regenerated cellulose casings but can be used for sausage casings of thicker wall construction of the type used for processing large sausages, e.g. bolognas, etc., and may be used for fibrous casings or casings of a non-cellulosic type, e.g. alginate, amylose, starch, collagen, etc.

Other embodiments which do not depart from the spirit and scope of the present invention, of course, will be apparent to those skilled in the art. Accordingly, it will be understood the present invention is to be limited only by the scope of the appended claims.

What is claimed is:

1. In the method of producing shirred sausage casings wherein a continuous length of sausage casing is fed onto a mandrel, inflated, and then shirred, the improvement comprising the steps of:

feeding the inflated casing through a humidification zone spraying preliminary to the shirring step onto the exterior of the inflated casing by means of an annular ring member having at least four (4) equiangularly spaced, spray emitting orifices positioned in the inner periphery of the ring, said orifices being positioned equiangularly around and equidistant from the axis of said inflated casing, a metered amount of humidification liquid defining a symetrical spray pattern convergent on the axis of said casing to produce a humidified casing having a predetermined moisture content, and controlling said spraying to the casing to time periods during which casing is travelling through said humidification zone.

2. The method according to claim 1 wherein said annular ring member is provided with at least eight of said spaced orifices.

* * * * *